(12) United States Patent
Krietzman et al.

(10) Patent No.: US 9,188,103 B2
(45) Date of Patent: Nov. 17, 2015

(54) WIND ENERGY SYSTEMS AND METHODS OF USE

(75) Inventors: Mark H. Krietzman, Palos Verdes, CA (US); Peter J. Gluck, Mission Viejo, CA (US); William A. Farone, Irvine, CA (US); Yung Chow, Irvine, CA (US)

(73) Assignee: AeroDynEnergy, Inc., Anaheim, CA (US)

( * ) Notice: Subject to any disclaimer, the term of this patent is extended or adjusted under 35 U.S.C. 154(b) by 872 days.

(21) Appl. No.: 13/501,661

(22) PCT Filed: Aug. 28, 2010

(86) PCT No.: PCT/US2010/047059
§ 371 (c)(1),
(2), (4) Date: Apr. 12, 2012

(87) PCT Pub. No.: WO2011/046676
PCT Pub. Date: Apr. 21, 2011

(65) Prior Publication Data
US 2012/0201676 A1   Aug. 9, 2012

Related U.S. Application Data

(60) Provisional application No. 61/278,815, filed on Oct. 13, 2009.

(51) Int. Cl.
*F03D 3/06* (2006.01)
*F03D 5/06* (2006.01)
*F03D 3/02* (2006.01)
*F03D 11/00* (2006.01)

(52) U.S. Cl.
CPC *F03D 3/061* (2013.01); *F03D 3/02* (2013.01); *F03D 5/06* (2013.01); *F03D 11/00* (2013.01); *F05B 2220/7068* (2013.01); *Y02E 10/70* (2013.01); *Y02E 10/74* (2013.01)

(58) Field of Classification Search
CPC .............. F03D 3/00; F03D 3/002; F03D 5/06
USPC ...................................... 416/79, 80
See application file for complete search history.

(56) References Cited

U.S. PATENT DOCUMENTS 4,024,409 A * 5/1977 Payne .............................. 290/55
4,219,309 A * 8/1980 Ross ............................... 416/80

(Continued)

FOREIGN PATENT DOCUMENTS

| CN | 1811174 | 8/2006 |
|---|---|---|
| CN | 101210541 | 7/2008 |

(Continued)

OTHER PUBLICATIONS

International Preliminary Report on Patentability issued Apr. 17, 2012 from corresponding International Application No. PCT/US2010/047059 filed Aug. 28, 2010 (8 pages).

(Continued)

*Primary Examiner* — Nathaniel Wiehe
*Assistant Examiner* — Michael Sehn
(74) *Attorney, Agent, or Firm* — Klein, O'Neill & Singh, LLP (57) ABSTRACT

Systems and methods to generate power using wind and controlled air movement and related structures to more cost effectively produce energy and protect system components.

24 Claims, 6 Drawing Sheets

(56) References Cited

U.S. PATENT DOCUMENTS

| | | | |
|---|---|---|---|
| 4,260,901 A * | 4/1981 | Woodbridge | 290/42 |
| 4,517,467 A * | 5/1985 | Fuhring | 290/44 |
| 2008/0206062 A1 * | 8/2008 | Sanz Pascual et al. | 416/226 |
| 2008/0304965 A1 * | 12/2008 | Syrovy | 416/117 |

FOREIGN PATENT DOCUMENTS

| | | |
|---|---|---|
| CN | 101210542 | 7/2008 |
| JP | 2001-132617 A | 5/2001 |
| JP | 2005-061218 A | 3/2005 |
| KR | 10 2002 0072471 A | 9/2002 |
| KR | 10 2003 0095831 A | 12/2003 |
| KR | 10 2008 0086001 A | 9/2008 |

OTHER PUBLICATIONS

Office Action on related Chinese Application No. 201080046247.7 from State Intellectual Property Office (SIPO) dated Jun. 30, 2014.

International Search Report completed May 6, 2011 and mailed May 9, 2011 from corresponding International Application No. PCT/US2010/047059 filed Aug. 28, 2010 (4 pages).

Written Opinion completed May 6, 2011 and mailed May 9, 2011 from corresponding International Application No. PCT/US2010/047059 filed Aug. 28, 2010 (5 pages).

Office Action on related Chinese Application No. 201080046247.7 from State Intellectual Property Office (SIPO) dated Feb. 17, 2015.

* cited by examiner

WIND ENERGY SYSTEMS AND METHODS OF USE

This application is a national phase filing, under 35 U.S.C. §371(c), of International Application No. PCT/US2010/047059, filed Aug. 28, 2010 and claims the benefit and priority of U.S. Provisional Patent Ser. No. 61/278,815, filed Oct. 13, 2009, which is herein fully incorporated by reference for all purposes.

BACKGROUND

1. Field Of The Disclosure

This disclosure relates to systems and methods for harnessing wind energy, and more specifically to wind turbines for producing electricity from wind energy.

2. Related Art

Typical horizontal axis wind turbines having multiple rotating blades are made to endure enormous destructive wind forces during operation. The wind forces may be created by wind conditions that vary from a no-wind condition to an extreme-wind condition. The rotating blades are generally designed such that the entire length of the blade is externally configured as an airfoil in cross-section since the airfoil shape of the rotor blade generally provides for a higher efficiency of performance.

However, because of the extremes in the variation of the wind conditions, the design considerations of the rotor blades must include a careful balancing of many factors. For example, the rotor blades must be constructed such that they are as lightweight as possible to reduce the strain on the tower. At the same time, however, consideration must be given to the possibility that the blades may be subject to resonance and harmonic vibration at their operating speeds. Moreover, the rotor blades need considerable strength to endure the buffeting of the winds and the stress they experience being constantly exposed to natural forces.

The horizontal axis wind turbines also suffer from several disadvantages due to their typically large-scale design. These concerns include not only the obscuring of the landscape with banks of rotating turbines, noise, and environmental safety, but that they are impractical for smaller, owner-controlled applications. Vertical axis turbines are generally much less efficient and exhibit frequent failures of the main top bearings due to the radial stress on the bearings. The blades also have to endure great shear forces from bottom to top due to the nature of wind shear.

As the use of wind turbines continues to present an environmentally friendly solution to help reduce the need for burning fossil fuels to generate electricity, what is needed is a wind turbine system that overcomes the aforementioned drawbacks.

SUMMARY

In one aspect, a wind energy collection system is provided that includes a wind lever assembly coupled to a base; and a rotatable support member supported by the base and coupled to the wind lever assembly. The wind energy collection system also includes a generator coupled to the rotatable support member. The wind lever assembly is moveable to a first displaced position causing the rotatable support member to rotate in a first direction, and moveable to a return position causing the rotatable support member to rotate in a second direction, where each rotation of the rotatable support member turns the generator.

In another aspect, a wind energy collection system is provided including a wind lever assembly having a wind lever and a counterweight. The wind lever is displaceable to a first displaced position in response to a wind load impinging on a surface area of the wind lever, and to a return position in response to the absence of the wind load impinging on the surface area of the wind lever. A rotatable support member is supported by a base and coupled to the wind lever assembly, where a displacement of the wind lever causes a rotation of the rotatable support member. A generator is also coupled to the rotatable support member. The generator generates a current as the wind lever displaces to the first displaced position, and generates a current as the wind lever displaces to the return position.

In yet another aspect, a method is provided for collecting wind energy using a reciprocating wind energy collection system. The method includes displacing a wind lever to a first displaced position in response to a wind load impinging on a surface area of the wind lever; rotating a rotatable support member in response to the displacing of the wind lever to the first displaced position; displacing the wind lever to a return position in response to the absence of the wind load impinging on the surface area of the wind lever; rotating the rotatable support member in response to the displacing of the wind lever to the return position; and generating a current as the wind lever displaces to the first displaced position, and generating a current as the wind lever displaces to the return position.

Advantageously, the wind energy collection system of the present disclosure is efficient in capturing the energy from the wind and converting it to power. For example, typical horizontal axis wind turbines are limited to capturing only about 60% maximum of the impinging energy. With the wind energy collection system of the present disclosure, higher energy efficiencies are possible.

Other features and advantages of the present disclosure will be set forth, in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure. The advantages of the present disclosure may be realized and attained by means of the instrumentalities and combinations particularly pointed out in the disclosure and any appended claims.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DESCRIPTION

A wind-energy conversion system includes at least three primary subsystems, an aerodynamic system, a mechanical transmission system and an electrical generating system. Generally, the physical configuration of the wind-energy conversion system produces an asymmetric force in the naturally occurring air currents or "wind" to control the air movement. The controlled air movements cause the physical configuration, including but not limited to, flow directing structures and collectors, to rotate, oscillate or translate, thus providing a mechanical energy from which electrical power may be generated. In some instances, a physical condition may be created, such as a pressure or temperature gradient, to control the air movement and create the motion that provides the mechanical energy. If the mechanical energy is used directly by machinery, for example, to pump water, cut lumber or grind stones, the machinery is generally referred to as a windmill. If the mechanical energy is instead converted to electricity, the machinery is generally referred to as a wind generator or wind turbine.

A Wind Metric refers to a mapping or measure of the ambient wind flow at a location or in a region. The metric is a measurement of a variable used to document and forecast the potential or actual wind energy associated with a location per that metric measure. Such information may be used to in determining placement of high-density wind turbines and determining support configuration and strength requirements to match the wind mapping of the area. Metrics may include but are not limited to measuring the variables over a determined or known time/date period of total amount of wind at a particular height, total amount of wind per direction, wind per direction, wind per height, wind speed overall (all directions—an average), wind speed per direction, wind speed per height, wind acceleration (all directions—an average) wind acceleration per direction, wind acceleration per height, wind duration (overall—an average), wind duration per direction, wind direction per height wind gusts (overall), wind gusts per direction, wind gusts per height, wind turbulence (overall), wind turbulence per direction, wind turbulence per height, wind angle (overall), wind angle per direction, and wind angle per height from the ground.

The Wind Power is equal to the air density multiplied by the cube of the wind velocity. The Wind Energy is the Wind Power accumulated over time.

Figure 1:
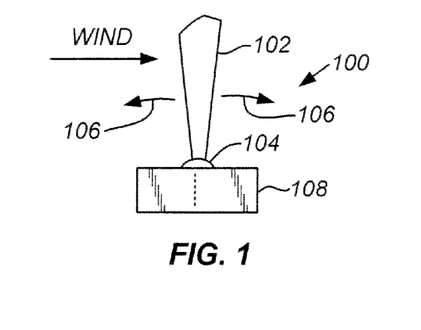
FIG. 1 is a simplified view of an exemplary implementation of a wind power system in accordance with an embodiment.

FIG. 1 is a simplified side view of an exemplary wind power system 100 in accordance with an embodiment. The wind power system 100 includes a blade 102 moveable on a pivot 104. The blade 102 is an extended element or member that is displaceable by the wind. The blade 102 may extend beyond the pivot 104, or alternately, a pivot arm (not shown) may be extended from the pivot 104 with the pivot arm coupled to the blade 102. In one example, the blade 102 may be an airfoil, a sheet, a sail and the like. In some embodiments, the blade being a member displaceable by the wind may take the form of a sail, an airfoil and the like. In some embodiments described below, the blade 102 may encompass or be referred to as a wind lever. The wind lever is a device where the wind provides a force against a surface area of the device to leverage that force against a horizontally rotatable shaft. The rotating shaft provides mechanical energy to a generator while the device is either moving with, or recovering from the effects of the force.

The pivot 104 refers to a fixture or system that may support from one to a plurality of blades in a moveable fashion. In one embodiment, the pivot allows the blade to rotate from a fixed point or pivot point in any desired direction. For example, the pivot 104 allows the blade 102 to oscillate, back and forth as represented by arrows 106.

The blade 102 via the pivot 104 is mounted on a base 108, which is used to support the blade 102 and the pivot 106. The base 108 may or may not be raised above ground level. For example, the base 108 may be supported on a tower, a rooftop or any other raised structure that is capable of supporting the wind power system 100. The base 108 is not intended to be limited to any specific structure, and may include a conical, cylindrical, multisided, multipart, tubular structure, having openings, closed walls, solid walls, and flexible and/or stiff walls. The base 108 may be made to any suitable height dimension that places the blade 102 in an optimal position for receiving a suitable wind current and that minimizes ground effects on the wind current. For example, in one embodiment, the height of the base 108 may be between about 50 meters and 100 meters, and preferably, between about 60 meters and 90 meters. In an alternative embodiment, for smaller, owner-controlled applications, the height of the base may be between about 1 meter and 15 meters, and preferably, between about 2 meters and 5 meters.

Figures 2, 4:
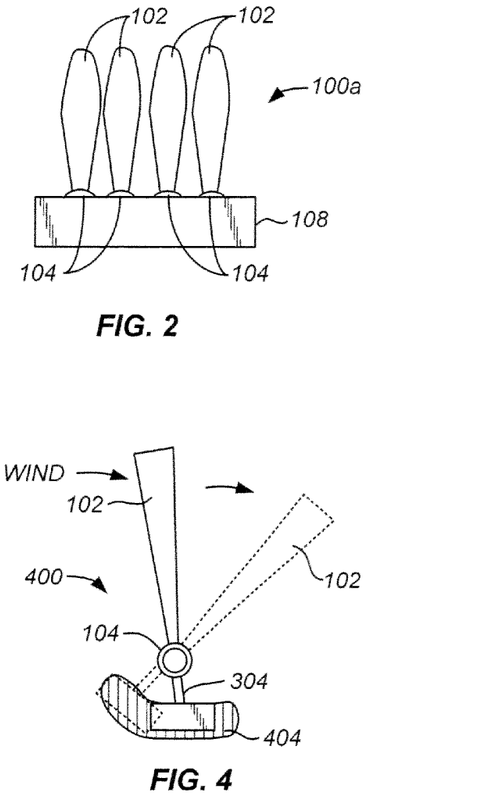
FIG. 2 is a simplified view of an exemplary implementation of a wind power system in accordance with an embodiment.
FIG. 4 is a simplified partial side view of an exemplary implementation of a wind power system in accordance with an embodiment.

FIG. 2 is a simplified illustration of an embodiment of a wind power system 100a, which includes a plurality of blades 102. In this multi-blade embodiment, base 108 may support a plurality of pivots 104, with each pivot supporting a blade 102. In one embodiment, the blades 102 are independently movable on one or more pivots 108 by the wind. It should be understood that the embodiments described below, which describe the implementation of wind power systems using a single blade or the equivalent, may also be implemented as a multi-blade system as shown in FIG. 2.

Figure 3:
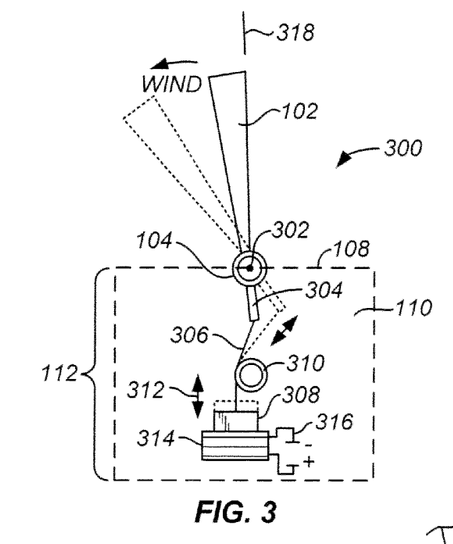
FIG. 3 is a simplified view of exemplary implementation of a wind power system in accordance with an embodiment.

In one implementation, the base 108 may define or include a space 110, that provides a location for positioning an electrical power generation system 112 (FIG. 3). In addition to providing a support structure for optimally positioning the blade 102, the base 108 may include an enclosed space 110 to provide for the protection of the power generation system 112 from debris and adverse weather or temperature conditions.

FIG. 3 is a schematic view of an exemplary implementation of a wind power system 300 in accordance with an embodiment including electrical power generation system 112. In one embodiment, electrical power generation system 112 may include an extended member 304, a line fixture 306, a moveable magnet 308, and a wire coil 314 along with additional support structures provided for securing and operating the components of the power generation system 112.

As shown in FIG. 3, the extended member 304 is coupled to, or adjacent to, the pivot 104 and extends in-line with, but in the opposite direction of the blade 102. A first end of the line fixture 306, such as a cable, a wire, a chain, a rope, or other similar structure is coupled to the extended member 304. A second end of the line fixture 304 is coupled to the magnet 308. One or more guides 310 along or around which the line fixture 306 may pass, may be interposed between the first end and the second end of the line fixture 304. The one or more guides 310 may include, for example, a wheel, a gear, a pulley, an idler or other similar guiding elements.

As indicated in FIG. 3, the magnet 308 is configured to move relative to the wire coil 314. For example, in one embodiment, the magnet 308 is configured to move up and down, as indicated by arrow 312, which moves the magnet in-and-out of the wire coil 314. The wire coil 314 is sized and shaped to receive at least a portion of the magnet within the boundaries of the coiled wire.

In one alternative embodiment, the magnet 308 may be one to a plurality of magnets fixed relative to the wire coil 314. In this embodiment, the wire coil 314 may be moved relative to the magnets, for example, within a space surrounded by one or more of the magnets 308. The wire coil 314 includes contacts 316 through which current can pass.

In operation, in the embodiment of FIG. 3, wind pressure and air currents impinge on the blade causing the blade to move about a pivot point 302. As the wind currents naturally ebb and flow, the blade 102 may oscillate back and forth about the pivot point 302. The back and forth movement of the blade 102 may be quantified as a variable degree of rotation relative to a centerline 318 of the wind power system 300. The blade 102 may oscillate less than 360 degrees from the centerline 318. In some embodiments, the blade 102 may oscillate from between approximately 0 and ±90 degrees from the centerline 318, for example, approximately between 0 and ±10 degrees, preferably approximately between 0 and ±5 degrees.

Movement of the blade 102 above the pivot point 302 causes the extended member 304 to also move below the pivot point 302, albeit in an opposite direction. The rotation of the extended member 304 pulls on the first end of the line fixture 306. The tension on the line fixture 306 substantially simultaneously causes the second end of the line fixture 306 to pull on the at least one magnet 308. The magnet 308 is thus made to move relative to the nest of coiled wire 314. The relative movement between the magnet and the wire creates a current within the coiled wire that may be passed to an electrical grid, or a storage device, such as a battery or capacitor, via electrical contacts 316.

As previously mentioned, although a single electrical power generation system 112 is shown in FIG. 3, this is not to be taken as a limitation and it should be understood that multiple blades 102 coupled to multiple electrical power generation systems 112 may be used in implementations, such as the wind power system 100a shown in FIG. 2.

Figure 5:
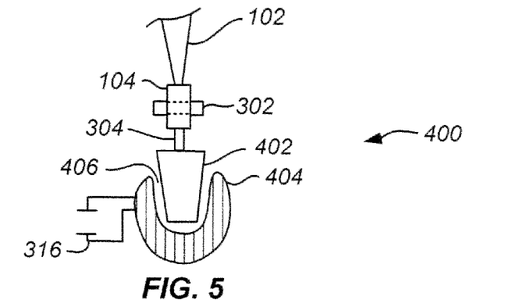
FIG. 5 is a simplified end view of the wind power system of FIG. 4 in accordance with an embodiment.

FIGS. 4 and 5 are simplified side and end views of an exemplary implementation of a wind power system 400 in accordance with an embodiment. Wind power system 400 is generally configured to operate as described above, however with the exceptions and alternatives described below. The wind power system 400 includes at least one to a plurality of blades 102 affixed to the one to a plurality of pivots 104, which are mounted to base 108 (not shown). With no intent to be limiting, the embodiment is described hereafter with reference to only a single blade/pivot system.

The blade 102 is movable on pivot 104 in response to the wind pressure and air currents impinging on the blade 102. In one embodiment, the blade 102 may extend beyond the pivot 104, or alternatively, a pivot arm may be extended from the pivot 104 coupled to the blade 102.

In one embodiment, the wind power system 400 includes the extended member 304 coupled to, or near the pivot 104 and extending in-line with, but in the opposite direction of the blade 102. As shown in FIGS. 4 and 5, one or more magnetic elements 402 are coupled to an end of extended member 304. The wind power system 400 also includes a coiled wire 404 that is positioned below the one or more magnetic elements 402 disposed at the end of the extended member 304. As shown in the figures, the coiled wire 404 may be formed as a channel defining an arched trough 406. The one or more magnetic elements 402 are sized and shaped to at least partially fit within the arched trough 406. The arched trough 406 is configured to receive at least partially, the one or more magnetic elements 402.

In operation, in the embodiment of FIGS. 4 and 5, as wind pressure and air currents impinge on the blade 102, the blade 102 moves about the pivot point 302. As the wind currents naturally ebb and flow, the blade 102 oscillates back and forth about the pivot point 302. Movement of the blade 102 above the pivot point 302 causes the extended member 304 to move below the pivot point 302, albeit in an opposite direction. The rotation of the extended member 304 causes the one or more magnetic elements 402 to move. The movement of the one or more magnetic elements 402 resembles the swinging of a pendulum. The magnet 402 positioned within the arched trough 406 "swings" at least partially within the confines of the coiled wire 404. The relative movement between the magnet and the wire creates a current within the coiled wire 404 that may be passed to an electrical grid, or a storage device, such as a battery or capacitor, via electrical contacts 316.

Figures 6, 7:
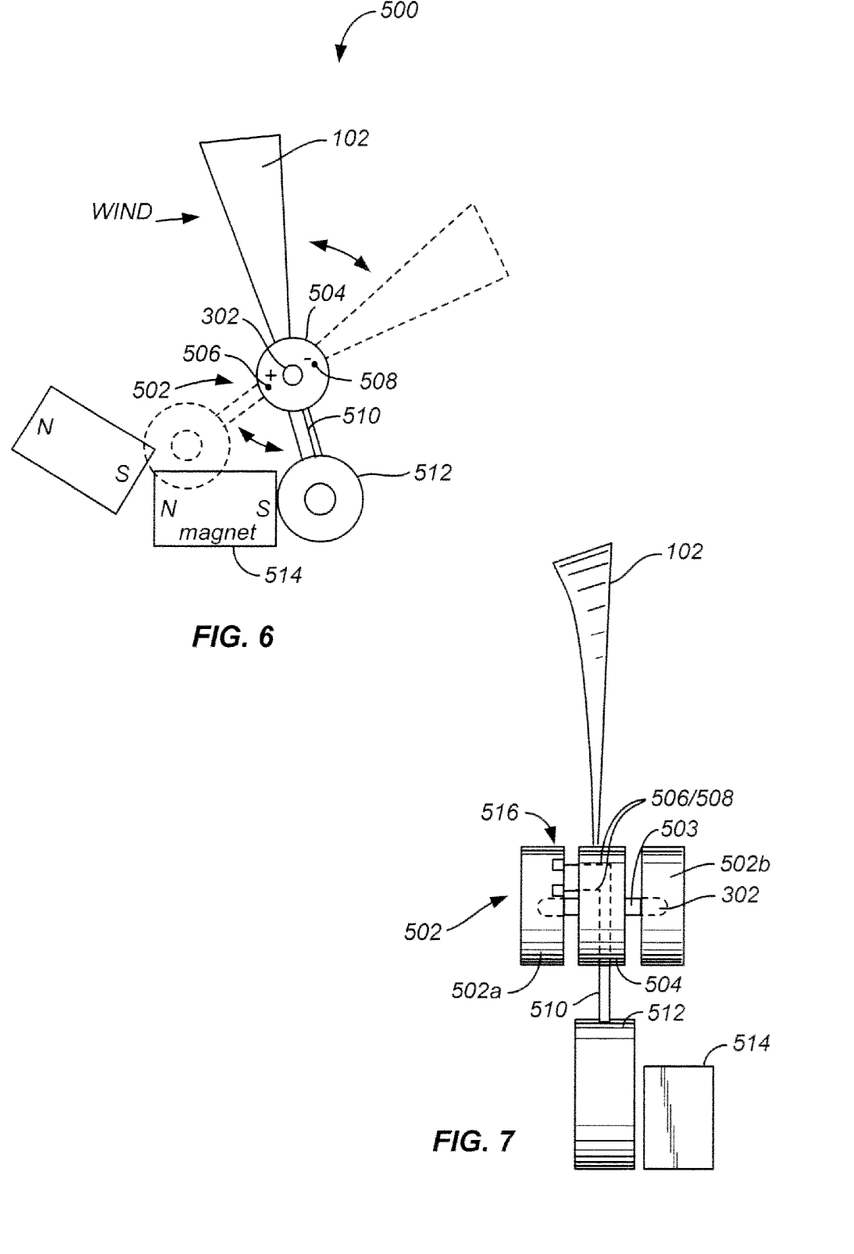
FIG. 6 is a simplified side view of an exemplary implementation of a wind power system in accordance with an embodiment.
FIG. 7 is a simplified end view of the wind power system of FIG. 6 in accordance with an embodiment.

FIGS. 6 and 7 are simplified side and end views of an exemplary implementation of a wind power system 500 in accordance with an embodiment. Wind power system 500 is generally configured to operate as described as the wind power systems described above, however with the exceptions and alternatives described below. The wind power system 500 includes at least one to a plurality of blades 102 affixed to the one to a plurality of pivots 502, which are mounted to the base 108 (not shown). With no intent to be limiting, the embodiment is described hereafter with reference to only a single blade/pivot system.

As shown in FIG. 7, in one embodiment, the pivot 502 includes a first pivot section 502a and a second pivot section 502b. The first and second pivot sections are coupled together via a pivot member 503 positioned at the pivot point 302 of the wind power system 500. The wind power system 500 also includes a contact support member 504. The contact support member 504 may be coupled to, or formed as part of, the blade 102. In this embodiment, the contact support member 504 is positioned at the end of the blade 102 and is positioned between the first and second pivot sections 502a and 502b of the pivot 502. The contact support member 504 is seated approximately concentric with the pivot member 503 at pivot point 302.

In one embodiment, the blade 102 and contact support 504 are coupled to an extended arm 510, which extends in-line with, but in an opposite direction, from the blade 102. The extended arm 510 moves about pivot point 302 as the blade 102 moves about pivot point 302 albeit in an opposite direction relative to the centerline of the system. A coiled wire 512 may be coupled to the end of the extended arm 510. The coiled wire 512 is operatively and electrically connected via a wire or other conductive element, to the contact elements 506 and 508 positioned on contact support member 504. In this manner, current generated in the wire coil 512 may be passed to the contacts 506 and 508.

One or more magnetic elements 514 may be positioned below the coiled wire 512 in proximity to the wire coil 512. The magnetic elements 514 may be formed in an arc (FIG. 6) so that the magnetic elements remain in proximity to the wire coil 512 as the wire coil is made to move.

In operation, as wind pressure and air currents impinge on the blade 102, the blade 102 moves about the pivot point 302. As the wind currents naturally ebb and flow, the blade 102 oscillates back and forth about the pivot point 302. Movement of the blade 102 above the pivot point 302 causes the extended arm 510 to move below the pivot point 302, albeit in an opposite direction. The rotation of the extended arm 510 causes the wire coil 512 to move. The movement of the wire coil 512 resembles the swinging of a pendulum. The coiled wire 512 positioned within the arc of magnetic elements "swings" through the magnetic field created by the magnetic elements 514. The relative movement between the magnetic elements 514 and the wire coil 512 creates a current within the coiled wire. Operationally, the current may be collected at the contacts 506 and 508 via a connection with out bound contacts 516 positioned on the pivot section 502*a* and passed to an electrical grid, or a storage device, such as a battery or capacitor.

Figure 8:
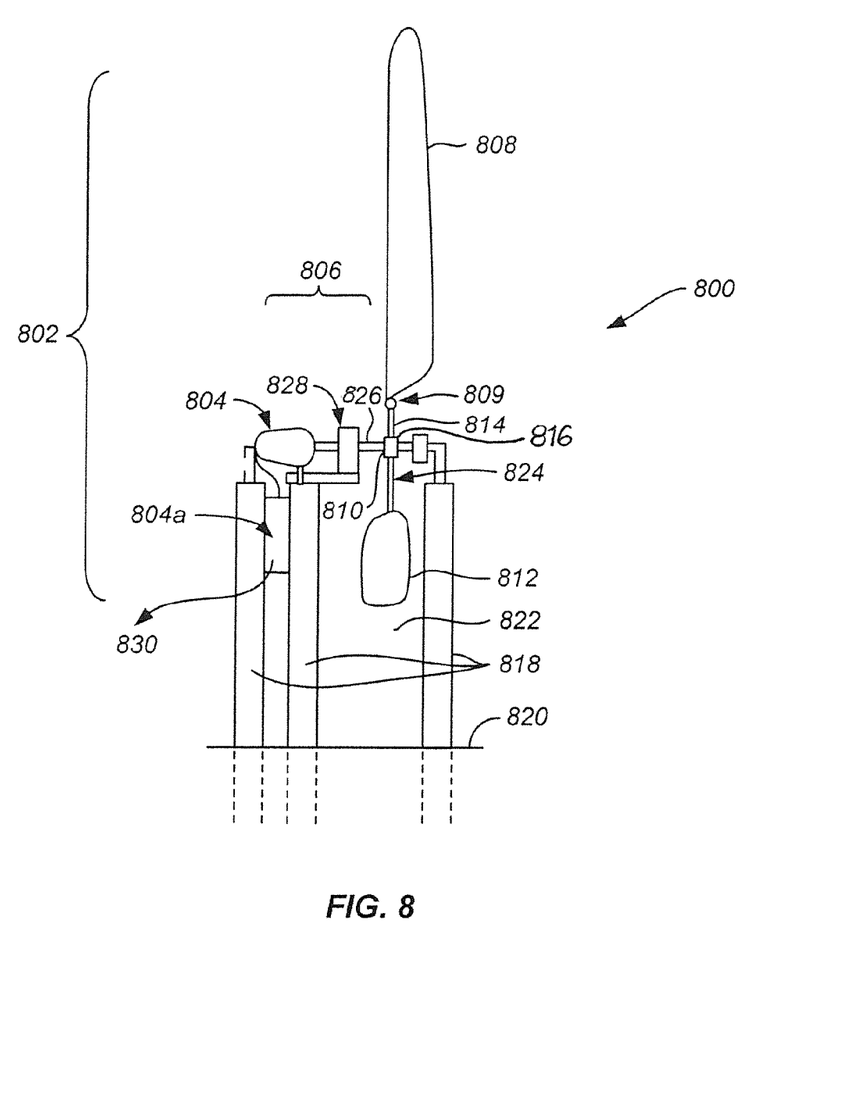
FIG. 8 is a simplified view of an implementation of a wind lever energy collection system in accordance with an embodiment.

FIG. 8 is a simplified view of a wind lever energy collection system 800 (hereinafter, the "wind lever system 800") in accordance with an embodiment. In one implementation, the wind lever system 800 includes a wind lever assembly 802, a generator 804, associated electronics 804*a*, and a mechanical drive assembly 806. The wind lever assembly 802 includes an extended element 808, such as a blade or sail, a pivot 810 and a counterweight 812.

The extended element 808 may be supported on an upper arm or pivot arm 814 to extend the reach of the extended member 808, if desired, and coupled directly to a rotatable support element 816. In one embodiment, the extended element 808 may include a sail pivot 809 interposed in the pivot arm 814. Using the sail pivot 809, at predetermined times, locations or in response to varying wind conditions, the extended element 808 may be pivoted to allow for at least one of, allowing wind energy capture, improving wind energy capture, preventing damage from high winds, adjusting the angle of the extended element to the wind and adjusting the extended element's return profile.

The rotatable support element 816 couples the wind lever assembly 802 to a support base 818, which is used to support the entire wind lever system 800. The base 818 may or may not be raised above ground level 820. For example, the base 818 may be lifted above the ground level 820 and supported on, for example, a tower, a rooftop or any other raised structure that is capable of supporting the base 818. The base 818 is not intended to be limited to any specific structure, and may include a conical, cylindrical, multisided, multipart, tubular structure, having openings, closed walls, solid walls, and flexible and/or stiff walls. The base 818 may be made to any suitable height dimension that places the extended element 808 in an optimal position for receiving a suitable wind current and that minimizes ground effects on the wind current.

The counterweight 812 is coupled to the pivot point via an extendable arm 824. The arm 824 supporting the counterweight 812 may be an extendable arm to change the distance of the weight from the pivot point to vary the amount of torque required to move the extended element 808. By controlling the required torque, the size of the oscillations that the extended element 808 is made or allowed to perform may also be controlled. The extension of the extendable arm may be done automatically in response to achieving a threshold value of preset criteria, or may be adjusted manually.

The counterweight 812 may be any suitable structure or other means that provides a counterbalancing function for the extended element 808. For example, in addition to a conventional gravitational mass, such as a metal weight, the counterweight 812 may include a waterway current, a piston, hydraulics, belts, gears, wheels, pulleys, chains, clutches, transmissions and the like. In one embodiment, the base 818 defines an open space 822 between the supporting structures that form the base 818. The open space 822 is sized and configured to provide an area below the extended element 808 to receive the counterweight 812 and provide enough room to allow the counterweight 812 to move (i.e. swing) within the space 822 without contacting the supporting structures.

In one alternative embodiment, the counterbalancing function provided by counterweight 812 may be provided using the electrical current generation systems described above with regard to FIGS. 3-7. For example, the function of the counterweight 812 shown in the embodiments of the wind lever assembly 802 may be provided by replacing the counterweight 812 with one or more magnetic elements, or a wire coil, disposed at the end of the extended arm 824. The magnetic elements, or the wire coil, are used in conjunction with a corresponding wire coil or magnetic element, respectively, which are positioned, for example, in the open space 822. The relative movement between the magnetic elements and wire coil may be used to generate an electric current as described above.

Referring again to FIG. 8, the mechanical drive assembly 806 may be used to couple and translate the kinetic energy provided by the movement of the extended element 808, and pass it to the generator 804 for generating a current. In some implementations, the generator 804 is a coil magnet type device, such as are well known in the art. The generator 804 may be connected to the associated electronics package 804*a* to provide at least one of, but without limitation: output, power conditioning, inversion to AC, DC to DC conversion, and conversion for storage. The generator 804 may include a uni-directional or bi-directional generator as is appropriate for use in a particular implementation as further described below.

In one implementation, the mechanical drive assembly 806 includes the capability to turn a bi-directional generator 804 to produce power. In this embodiment, the capability includes a direct drive system for use with the bi-directional generator. The direct drive system may include a rotating/reciprocating shaft 826 coupled to the extended element 808, the counterweight 812, and the bi-directional generator 804. The shaft 826 is capable of moving in a clockwise and counterclockwise direction. In this implementation, as the extended element 808 and counterweight 812 move or reciprocate back and forth, the shaft 826 also moves and thus turns the generator 804 in either the clockwise or the counterclockwise direction to produce power while moving in either direction.

In some implementations, a drive mechanism 828, such as a chain, gear or belt drive assembly, may be used to alter the rotational speed of the shaft 826. The drive mechanism 828 may include fixed or variable gears, pulleys, wheels, belts, pulleys, and chains, hydraulic coupling and may include a clutch, a transmission (either regular or continuously variable) and the like, that may be used to alter the rotational movement transferred to the generator 804. In this implementation, the drive 828 may be a bi-directional drive, so that both the clockwise and counterclockwise rotation of the shaft 826 is transferred to the bi-directional generator.

In some implementations, a uni-directional generator may be selected, and accordingly, the drive mechanism 828 may be a one-way drive that only translates rotation in one direction to the generator 804.

The current generated by the generator 804, and any other current generated, for example, through the optional use of the current generating systems shown in FIG. 3-7, may be passed to a storage device, such as a battery or capacitor. Unless being stored, the output from the electronics package 804a may be fed out of the system via one or more line outs 830.

In operation, the wind lever system 800 is a reciprocating wind energy collection system that operates in a wind capture/lever return cycle in accordance with an embodiment. The wind is captured by the extended element 808, in the form of a blade or sail. From a generally vertical orientation relative to the ground, the sail is displaced either clockwise or counterclockwise about the pivot point during a "wind capture ½ cycle." The movement of the sail, in turn, moves or rotates the shaft 826. The shaft may be directly connected to the generator 804, or may be connected to an intervening drive assembly 828. As described above, the drive assembly 828 provides a capability for adjusting the rotational speed of the shaft for providing an altered rotational speed to the generator 804, if desired.

Once the displacement of the sail is complete, the wind capture ½ cycle is complete. The lever return ½ cycle is then initiated. The counterweight 812 or other equivalent means suspended from or acting on the extendable arm 824 (or an additional structure below the sail, such as described with regard to FIGS. 3-7) provide a force to at least partially restore the displaced sail back towards the substantially vertical orientation where the wind capture ½ cycle began. The return of the sail completes the wind capture-lever return cycle.

In one embodiment, it is understood that changing the sail or blade surface area and keeping other system variables, such as wind speed, wind acceleration, wind turbulence, counter weight and magnetic fields constant, corresponds to an increase or decrease in the wind energy that may be harvested using the wind power system 800. For example, using the sail pivot 809, the sail 102 may be deployed to provide a large wind facing surface area for initial wind capture during the wind capture ½ cycle. The surface area profile of the sail 102 may then be altered by turning the sail so that it does not face the wind direction. By reducing the surface of the sail exposed to the wind direction, the force against which the sail pushes against is reduced. The sail returns during the lever return ½ cycle to its initial position.

Reducing the force that the sail must work against during the return ½ cycle makes the system more efficient. Reducing the drag on the sail for the return ½ cycle of the movement may also reduce the forces needed to complete the lever return ½ cycle. Changing the counter weight position is a means to use the balance of plant (BOP) to adjust sail, device, system and method parameters in response to variables, such as wind speed, power demands, magnetic fields and the like.

Figure 9:
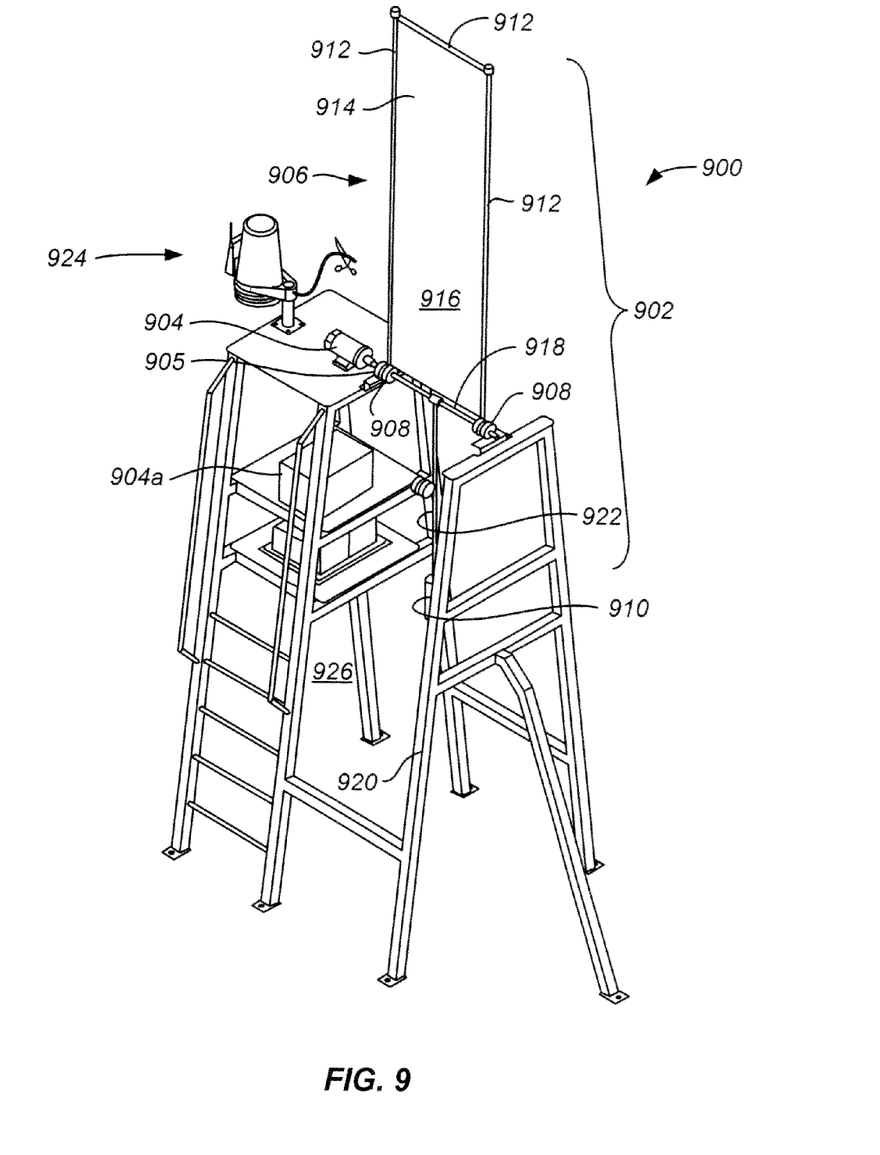
FIG. 9 is a simplified perspective view of an implementation of a wind lever energy collection system in accordance with an embodiment.

FIG. 9 is a perspective view of a wind lever energy collection system 900 (hereinafter, the "wind lever system 900") in accordance with an exemplary embodiment. In one implementation, the wind lever system 900 includes a wind lever assembly 902, a generator 904, associated electronics 904a, and a mechanical drive assembly 905. The wind lever assembly 902 includes an extended element 906, such as a blade, sail or wind lever, pivots 908 and a counterweight 910.

Figure 10A:
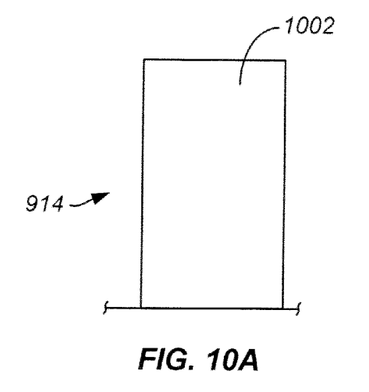
FIGS. 10(a) and 10(b) are simplified illustrations of embodiments of a wind lever.
Figure 10B:
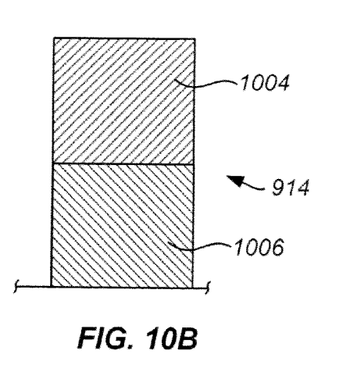

In this exemplary implementation, the extended element 906 (hereinafter, the "wind lever 906") may have a frame 912 that supports a flexible wind deflector 914. The wind deflector 914 is capable of blocking, deflecting, redirecting, reflecting or otherwise responding to the movement of wind currents that impinge on a surface area 916 of the deflector 914. In one embodiment, the wind deflector 914 may be made of a solid, a mesh, or a multi-part material. For example, as shown in FIG. 10(a) the wind deflector 914 may be made of the same discrete material 1002 throughout. As shown in FIG. 10(b) the wind deflector 914 may have multi-zones 1004 and 1006, where each zone includes a different type of material. Each wind deflector material may be made from a variety of individual homogenous materials, or may be made from a combination of materials, each of which is capable of providing adequate structural support to withstand the variable wind loads that may be experienced by the wind deflector 914 at the various zones. For example, the wind deflector 914 may be a made of a metal, a polymer, Dacron, a canvas material, a composite material, such as carbon, fiberglass, and fiberglass-reinforced plastic, or any combination of these materials.

The wind deflector 914 may be formed with any suitable surface geometric shape depending on the specific implementation. For example, the wind deflector 914 may have a flat surface that is capable of being positioned perpendicular to the wind direction, a multifaceted surface that includes multiple flat surfaces positioned at various angles to the wind direction, or a curved surface, that may have a circular, parabolic, hyperbolic, elliptical or similarly curved geometry. In some implementations, the geometry of the wind deflector 914 may include a combination of the geometries thus described.

The size of the lever 906 may vary based on many variables, for example, depending upon the requirements for energy production and the space available for implementation. In one embodiment, the size of the wind lever 906 may be between about 1 meter and 2 meters, for example, about 1.5 meters in width, and between about 1.5 meters and 3 meters, for example, 2 meters in length.

Figure 11A:
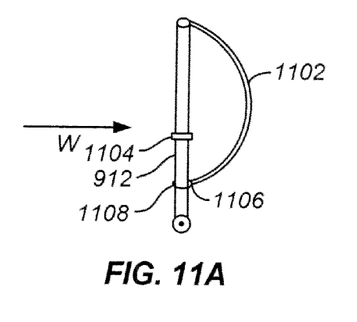
FIGS. 11(a) and 11(b) are side and perspective views, respectively, of a wind lever in accordance with an embodiment.
Figure 11B:
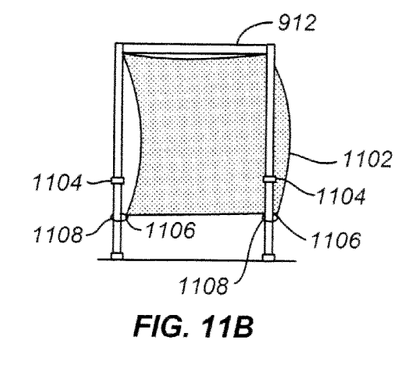

In one embodiment, as shown in FIGS. 11(a) and 11(b), a wind deflector 1102 may be mounted on frame 912 such that the edges of the wind deflector 1102, with the exception of the top edge, or at least the top corners, are not rigidly or fixedly mounted to the frame 912. In this embodiment, the bottom corners 1106 may be attached to a slidable member 1108, which is slidably attached to the frame 912, such that the slidable members may move along the frame. The slidable member 1108 may include any suitable member that can attach to the wind deflector and be capable of sliding along the frame. For example, the slidable member 1108 may be a circular ring, or a cylindrical bushing, which allow a portion of the frame to pass therethrough. Since the side edges of the wind deflector 1102 are not mounted to the frame 912, the bottom corners 1106 of the wind deflector 1102 may rise and fall as the wind impinges on the surface of the wind deflector 1102. As the wind pressure increase on the wind deflector 1102, the wind deflector 1102 rises up to reduce the amount of surface area of the wind deflector effectively exposed to the wind. In one embodiment, physical stops 1104 may be positioned on the frame 912 to limit the movement of each slidable member 1108 along the frame 912 to control the amount that the wind deflector 1102 rises, and thus control the change in the effectively exposed surface area of the wind deflector. Thus, the deflector is moveable between a fully deployed configuration, where substantially all of a surface area of the deflector is effectively exposed to a wind vector, and a partially deployed configuration, where only a portion of the surface area of the deflector is effectively exposed to the wind vector.

Figure 11C:
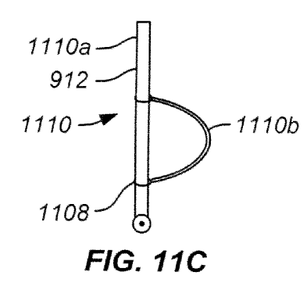
FIGS. 11(c) and 11(d) are side and perspective views respectively, of a wind lever in accordance with an embodiment.
Figure 11D:
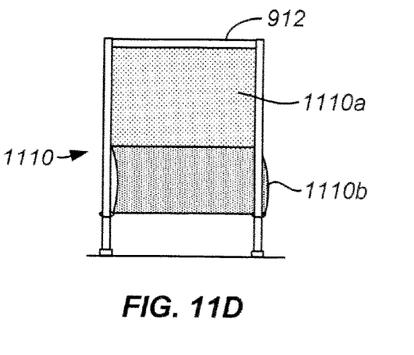

As shown in FIGS. 11(c) and (d), in an alternative embodiment, the wind deflector 1110 may be divided into two sections. A first section 1110a may be fixedly and rigidly attached to the frame 912. The first section 1110a may generally comprise approximately the top quarter to top half of the wind deflector surface area. A second section 1110b may be mounted on frame 912 such that the edges of the second section 1110b, with the exception of the top edge, or at least the top corners, are not rigidly or fixedly mounted to the frame 912. In this embodiment, the bottom corners may be attached to the slidable members 1108, which are slidably attached to the frame 912, such that the slidable members may move along the frame. As the wind pressure increases on the wind deflector 1110, the second section 1110b rises up to reduce the exposed surface area of the second section 1110b of the wind deflector. It should be understood that the amount of surface area of the wind deflector that is allotted to be included in either the first or the second sections 1110a and 1110b might vary for any given implementation.

Referring again to FIG. 9, the wind deflector 914 and frame 912 are supported on a rotatable support element 918 via pivots 908. In one embodiment, pivots 908 may include, for example ball bearings, bushings and the like, located at opposing ends of the rotatable support element 918 and mounted on a support base 920. The counterweight 910 is also coupled to the rotatable support member 918 via an extendable arm 922. Thus, as the wind lever 906 and the counterweight are displaced, the rotatable support element 918 may be made to rotate.

The rotatable support element 918 couples the wind lever assembly 902 to the support base 920. The base 920 may be seated on the ground or may be raised above ground level. For example, the base 920 may be lifted above the ground level, or the base 920 may be supported on a tower, a rooftop or any other raised structure that is capable of supporting the base 920. The base 920 is not intended to be limited to any specific structure, and may include a conical, cylindrical, multisided, multipart, tubular structure, having openings, closed walls, solid walls, and flexible and/or stiff walls.

The base 920 may be made to any suitable height dimension that places the lever 906 in an optimal position for receiving a suitable wind current and that minimizes ground effects on the wind current. In one embodiment, by way of example and not limitation, the base 920 may have a height of between about 2 meters and 5 meters, for example, about 3 meters. It should be understood that the footprint of the base may vary depending upon the application of the wind lever system. By way of example, and not limitation, the footprint of the base 920 may be approximately 2 meters by 2 meters.

The counterweight 910 may be any suitable structure or other means that provides a counterbalancing function for the wind lever 906. For example, the counterweight 910 is a conventional gravitational mass, such as a metal weight. In one embodiment, the base 920 defines an open space 926 that is configured to receive the counterweight 910 and provide enough space to allow the counterweight 910 to move (i.e. swing) within the space 926 without contacting the base 920 as the wind lever 906 is being displaced.

Figure 12:
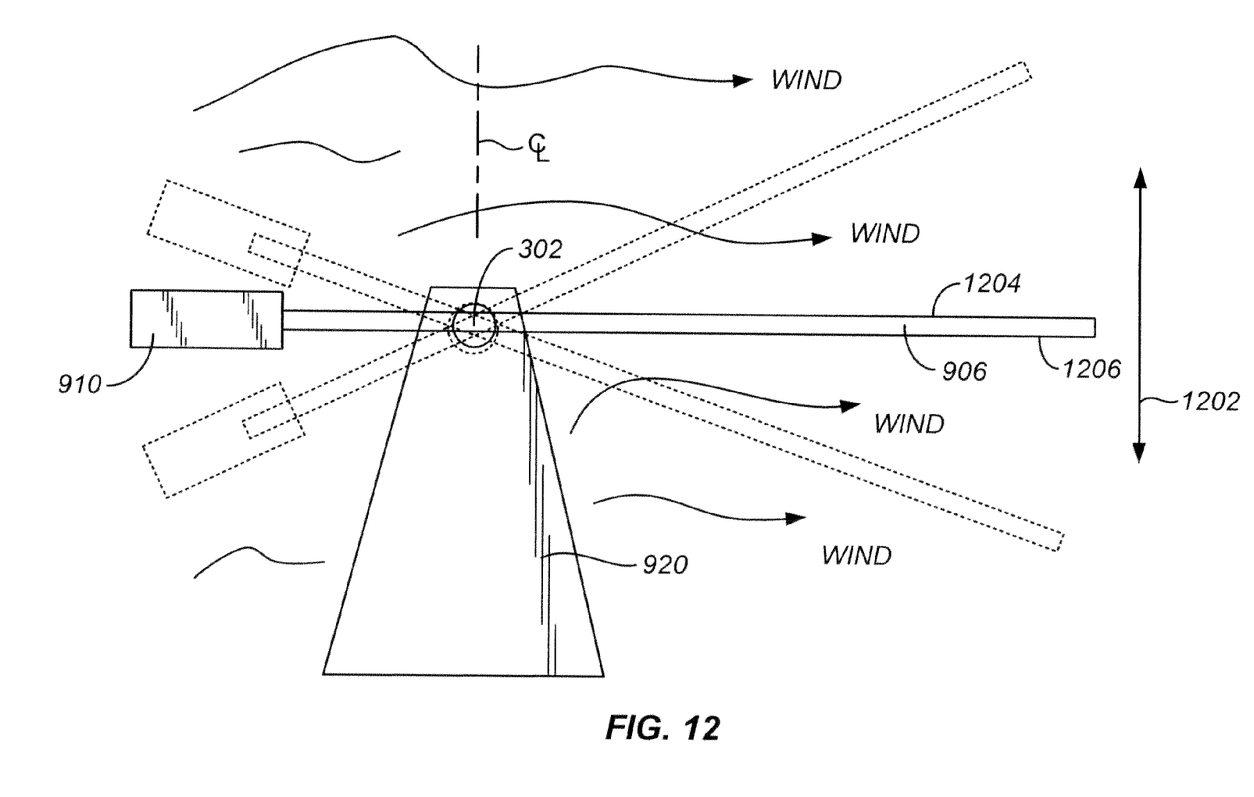
FIG. 12 is a simplified schematic view of a wind lever and a counterweight in a substantially horizontal orientation in accordance with an embodiment.

Contrary to lock out, braking and other systems that are known in the art to dampen or reduce blade movement and speed during high winds on horizontal axis wind turbines and vertical axis wind turbines, the wind lever system "self-adjusts" to high wind conditions with no braking or stopping. In some embodiments, the wind lever continues to generate power when high wind speed results in forcing the wind lever into a substantially horizontal position. As described below, the instability of the wind lever caused generally by the counterweights and variations in wind currents also provides the desired movement for the generation of power. For example, in one embodiment, when confronted with high winds of continuous high velocity, the open space 926 allows the wind lever 906 and counterweight 910 to rotate to a substantially horizontal orientation without interference from the supporting structures of the base 920. FIG. 12 is a simplified schematic view of the wind lever assembly 902 in a substantially horizontal orientation caused by exposure to continuous high winds. As shown in the figure, the wind lever assembly 902 is generally unstable in the horizontal orientation. The instability is caused by the imbalance created by inconsistent wind forces impinging on both surfaces 1204 and 1206 of the wind lever 906, and the inability of the counterweight 910 to overcome the imbalance and right the orientation of the wind lever assembly 902 to a vertical orientation along the centerline of the wind lever assembly 902. In this orientation, the wind causes the wind lever 906 to oscillate up and down relative to the ground as indicated by arrow 1202. These oscillations, however, still cause the wind lever system 900 to cycle through the wind capture-lever return cycle. In this orientation, the oscillations occur about the horizontal axis of the wind lever system 900. The cycling of the system about the horizontal axis, causes the rotatable shaft 918 to turn the generator 904 and generate a current as described below. Thus, advantageously, one of ordinary skill in the art should understand that in either low or high wind environments or conditions, the wind lever system is capable of generating useable energy, and is not limited by the use of lockout, brake and similar systems that typically limit movements in high wind.

Referring again to FIG. 9, the extendable arm 922 coupled to the counterweight 910 may be extendable so as to vary the amount of torque required to displace the wind lever 906 about the pivots 908. By controlling the required torque, the size of the oscillations that the wind lever 906 is made to perform may also be controlled. The extension of the extendable arm may be done automatically in response to arriving at threshold of a preset criteria, or may be adjusted manually. The preset criteria may be for example, the amount of wind speed or acceleration experienced at the wind lever 906. An anemometer 924 may be positioned adjacent the lever 906 for recording the wind speed and other associated parameters for determining when the particular threshold has been reached.

The wind lever system 900 is a reciprocating wind energy collection system that operates in the wind capture-lever return cycle in accordance with an embodiment. The wind captured by the wind lever 906 displaces the lever in either the clockwise or the counterclockwise direction relative to a vertical centerline of the system during the wind capture ½ cycle. The wind lever rotates about the pivots 908. The displacement of the wind lever 906 may be between about 0 degrees from the centerline to about ±90 degrees from the centerline, preferably between about 0 and about ±10 degrees, for example, about ±5 degrees. The rotatable support element 918 may be used to couple and translate the kinetic energy provided by the movement of the wind lever 906 and pass it to the generator 904 for generating a current. The generator 904 may be connected to the associated electronics package 904a to provide at least one of, but without limitation: output, power conditioning, inversion to AC, DC to DC conversion, and conversion for storage. In this exemplary embodiment, the generator 904 is a bi-directional generator capable of being driven directly by the rotating/reciprocating support shaft 918.

Once the displacement is complete, the lever return ½ cycle is initiated. The counterweight 910 suspended from or acting on the extendable arm 922 provides a force to at least partially restore the displaced wind lever back towards the substantially vertical orientation where the wind capture ½ cycle began. In turn, the movement of the wind lever 906 as its position is being restored again moves or rotates the rotatable support shaft 918, which is directly connected to the generator 904 for producing power. The return of the wind lever 906 to the initial position completes the wind capture-lever return cycle. As the wind continues to blow, the rotating/reciprocating support shaft 918 continues to be moved in the clockwise and the counterclockwise reciprocating directions to produce power in the generator 904 as the wind lever assembly 902 continues to cycle through the wind capture-lever return cycle.

While the present disclosure has been shown and described with reference to specific embodiments thereof, it will be understood by those skilled in the art that various changes in form and details may be made therein without departing from the spirit and scope of the invention. Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A wind energy collection system comprising:
   a wind lever assembly coupled to a rotatable support member; and
   a generator coupled to the rotatable support member, the wind lever assembly moveable to a first displaced position causing the rotatable support member to rotate in a first direction, and moveable to a return position causing the rotatable support member to rotate in a second direction, where each rotation of the rotatable support member turns the generator
   wherein the wind lever assembly comprises a wind lever coupled to the rotatable support member, and a counterweight coupled to the rotatable support member via an extendable arm;
   wherein the counterweight comprises a magnetic element received within a wire coil and coupled to the extendable arm; and
   wherein movement of the wind lever assembly to the first displaced position and movement of the wind lever assembly to the return position cause the magnetic element to move relative to the wire coil.

2. The wind energy collection system of claim 1, wherein the first displaced position comprises a rotation of less than 360 degrees from a centerline of the wind lever assembly.

3. The wind energy collection system of claim 1, wherein the first displaced position comprises a rotation of less than 5 degrees from a centerline of the wind lever assembly.

4. The wind energy collection system of claim 1, wherein the wind lever assembly comprises a wind lever having a deflector, and a counterweight.

5. The wind energy collection system of claim 4, wherein the deflector comprises multiple zones of varying material.

6. The wind energy collection system of claim 1, wherein the deflector is moveable between a fully deployed configuration, wherein substantially all of a surface area of the deflector is effectively exposed to a wind vector, and a partially deployed configuration, wherein only a portion of the surface area of the deflector is effectively exposed to the wind vector.

7. The wind energy collection system of claim 1, wherein the wind lever assembly comprises a wind lever, and wherein the movement to the first displaced position is in response to a wind load impinging on a surface area of the wind lever.

8. The wind energy collection system of claim 7, wherein the movement to the return position is in response to the absence of the wind load impinging on the surface area of the wind lever.

9. The wind energy collection system of claim 1, wherein the counterweight comprises:
   a coiled wire coupled to the extendable arm, and wherein the coiled wire is positioned adjacent to at least one magnetic element, wherein movement to the first displaced position and movement to the return position cause the coiled wire to move relative to the at least one magnetic element.

10. The wind energy collection system of claim 1, wherein the generator comprises a bi-directional generator.

11. The wind energy collection system of claim 1, wherein the wind lever assembly comprises a plurality of wind lever assemblies each coupled to the base.

12. The wind energy collection system of claim 1, further comprising a drive mechanism coupled between the generator and the rotatable support member, wherein the drive mechanism alters performance parameters of the rotatable support member.

13. A wind energy collection system comprising:
   a wind lever assembly having a wind lever displaceable to a first displaced position in response to a wind load impinging on a surface area of the wind lever, and to a return position in response to the absence of the wind load impinging on the surface area of the wind lever;
   a rotatable support member supported by a base and coupled to the wind lever assembly, where a displacement of the wind lever causes a rotation of the rotatable support member, the wind lever assembly including a counterweight coupled to the rotatable support member by an extendable arm, the counterweight comprising a magnetic element coupled to the extendable arm, wherein the magnetic element is received within a wire coil, and wherein movement of the wind lever to the first displaced position and movement to the return position cause the magnetic element to move relative to the wire coil; and
   a generator coupled to the rotatable support member, the generator generating a current as the wind lever displaces to the first displaced position, and generating a current as the wind lever displaces to the return position.

14. The wind energy collection system of claim 13, wherein the first displaced position comprises a rotation of less than 5 degrees from a centerline of the wind lever assembly.

15. The wind energy collection system of claim 13, wherein the wind lever comprises a deflector having multiple zones of varying materials.

16. The wind energy collection system of claim 13, wherein the wind lever comprises a deflector, and wherein the deflector is moveable between a fully deployed configuration, wherein substantially all of a surface area of the deflector is effectively exposed to the wind load, and a partially deployed configuration, wherein only a portion of the surface area of the deflector is effectively exposed to the wind load.

17. The wind energy collection system of claim 13, wherein the counterweight comprises:
a coiled wire coupled to the extendable arm, and wherein the coiled wire is positioned adjacent to at least one magnetic element, wherein movement to the first displaced position and movement to the return position cause the coiled wire to move relative to the at least one magnetic element.

18. The wind energy collection system of claim 13, further comprising a drive mechanism coupled between the generator and the rotatable support member, wherein the drive mechanism alters performance parameters of the rotatable support member.

19. A method for collecting wind energy using a reciprocating wind energy collection system comprising:
providing a wind lever coupled to a rotatable support member, the wind lever including a counterweight coupled to the rotatable support member by an extendable arm, wherein the counterweight comprises a magnetic element received within a wire coil and coupled to the extendable arm;
displacing the counterweight in a first direction to displace the wind lever to a first displaced position in response to a wind load impinging on a surface area of the wind lever;
rotating a rotatable support member in response to the displacing of the wind lever to the first displaced position;
displacing the counterweight in a second direction to displace the wind lever to a return position in response to the absence of the wind load impinging on the surface area of the wind lever;
rotating the rotatable support member in response to the displacing of the wind lever to the return position; and
generating a current as the wind lever displaces to the first displaced position, and generating a current as the wind lever displaces to the return position;
wherein displacing the wind lever to the first displaced position and displacing the wind lever to the return position cause the magnetic element to move relative to the wire coil.

20. The method of claim 19, wherein displacing the wind lever to the first displaced position comprises rotating the wind lever less than 360 degrees from a centerline of the wind lever assembly.

21. The method of claim 19, wherein displacing the wind lever to the first displaced position comprises rotating the wind lever less than 10 degrees from a centerline of the wind lever assembly.

22. The method of claim 19, wherein the wind energy collection system comprises a deflector, the method further comprising moving the deflector between a fully deployed configuration, wherein substantially all of a surface area of the deflector is effectively exposed to the wind load, and a partially deployed configuration, wherein only a portion of the surface area of the deflector is effectively exposed to the wind load.

23. The method of claim 19, wherein the counterweight comprises:
a coiled wire coupled to the extendable arm, and wherein the coiled wire is positioned adjacent to at least one magnetic element, wherein displacing the wind lever to the first displaced position and displacing the wind lever to the return position cause the coiled wire to move relative to the at least one magnetic element.

24. The method of claim 19, wherein the wind lever includes a deflector comprising multiple zones of varying materials.

* * * * *